United States Patent

Mattingly et al.

[11] Patent Number: 5,551,543
[45] Date of Patent: Sep. 3, 1996

[54] SORTER

[75] Inventors: James F. Mattingly, Louisville; Ellsworth H. Collins, Mt. Washington, both of Ky.

[73] Assignee: Interlake Companies, Inc., Shepherdsville, Ky.

[21] Appl. No.: 410,728

[22] Filed: Mar. 27, 1995

[51] Int. Cl.⁶ .................................. B65G 47/46
[52] U.S. Cl. .................. 198/370.09; 198/370.01
[58] Field of Search ................. 198/370.01, 370.09, 198/370.1, 782, 817

[56] References Cited

U.S. PATENT DOCUMENTS

| | | |
|---|---|---|
| 830,196 | 9/1906 | Bailey . |
| 1,965,056 | 1/1934 | Rieke . |
| 2,322,190 | 6/1943 | Fleming . |
| 2,451,424 | 10/1948 | Williams . |
| 2,468,925 | 5/1949 | De Boer . |
| 3,104,004 | 9/1963 | Poel et al. ............... 198/370.01 X |
| 3,174,613 | 3/1965 | Insolio . |
| 3,504,784 | 4/1970 | Noyes . |
| 3,527,337 | 9/1970 | Formo . |
| 3,592,325 | 7/1971 | Sullivan et al. ................ 198/370.1 |
| 3,710,917 | 1/1973 | Black et al. . |
| 3,768,630 | 10/1973 | Inwood et al. . |
| 3,880,298 | 4/1975 | Habegger et al. . |
| 3,910,402 | 10/1975 | Dean . |
| 3,973,672 | 8/1976 | Frost . |
| 3,983,988 | 10/1976 | Maxted et al. . |
| 4,006,816 | 2/1977 | Werntz . |
| 4,031,998 | 6/1977 | Suzuki et al. . |
| 4,039,074 | 8/1977 | Maxted . |
| 4,044,897 | 8/1977 | Maxted . |
| 4,181,947 | 1/1980 | Krauss et al. . |
| 4,319,675 | 3/1982 | Turnbough . |
| 4,399,675 | 8/1983 | Erdmann et al. . |
| 4,598,815 | 7/1986 | Adama . |
| 4,738,347 | 4/1988 | Brouwer et al. . |
| 4,746,003 | 5/1988 | Yu et al. . |
| 4,747,477 | 5/1988 | Benz et al. . |
| 4,760,908 | 8/1988 | Houghton . |
| 4,792,034 | 12/1988 | Leemkuil ..................... 198/370.09 |
| 5,012,914 | 5/1991 | Berends et al. . |
| 5,117,961 | 6/1992 | Nicholson . |
| 5,287,956 | 2/1994 | Collins et al. . |
| 5,323,912 | 6/1994 | Fan et al. . |
| 5,333,715 | 8/1994 | Sapp . |
| 5,333,722 | 8/1994 | Ouellette . |
| 5,375,696 | 12/1994 | Collins et al. . |

FOREIGN PATENT DOCUMENTS

| | | | |
|---|---|---|---|
| 3195626 | 8/1991 | Japan .................... | 198/370.1 |
| 2210841 | 6/1989 | United Kingdom ........... | 198/370.09 |

*Primary Examiner*—James R. Bidwell
*Attorney, Agent, or Firm*—Wheat, Camoriano, Smith & Beres, PLC

[57] ABSTRACT

A sorter uses pushers to push products over angled idler wheels in order to sort the products off of the main conveyor path.

9 Claims, 15 Drawing Sheets

SORTER

BACKGROUND OF THE INVENTION

The present invention relates to conveyors, and, in particular, to a conveyor in which products can be sorted off onto spurs as they travel along the main conveyor path.

Several different types of sortation conveyors are known, and they all have drawbacks. With a sliding shoe sorter, products can only be fed onto the sortation conveyor at the end, and a substantial amount of energy must be used to run the conveyor, even when very few products are being carried, because the sliding shoes and their mechanisms must be carried along with the conveyor. These sorters are also expensive to buy and to maintain.

A tilt tray sorter has the advantage of being able to receive products from the side, so it can have several inputs, but it subjects products to considerable shock loads, which is not suitable for fragile products. Also, product orientation cannot be maintained in this type of sorter.

Diverters are also known, using driven wheels, O-rings, or belts to carry the products off of the main conveyor path, but these diverters cannot operate at high speeds. Product tracking is not good with these diverters, because products may slip on the diverting mechanism.

SUMMARY OF THE INVENTION

The present invention provides a sorter which is gentle in handling products.

The present invention provides a sorter which is flexible, in that products can be inducted at various points along the conveyor and can be sorted off to either side at various points along the conveyor.

The present invention provides a sorter which is much more energy efficient than sliding shoe sorters.

The present invention provides a sorter which is less expensive to buy and less expensive to maintain than most prior art sorters.

DESCRIPTION OF THE PREFERRED EMBODIMENTS

All of the FIGS. 1–20 described above show various embodiments of the present invention, in which products are sorted off of a main conveyor path by being pushed over diverting idler (non-driven) wheels. When the products are pushed over idler wheels that are directed at an angle to the main conveyor path, the angled idler wheels cause the products to move off of the main conveyor path, onto a second path.

In the first embodiment of the invention, shown in FIGS. 1–5, the products are carried along the conveyor on carrier attachments mounted on chains. If the products are to be sorted off of the main path, the carrier attachments under the products drop down, setting the products onto diverting idler wheels. The carrier attachments directly behind the products do not drop down but remain elevated, serving as pushers, which push the products along the diverting idler wheels and off of the main conveyor path.

In the second embodiment of the invention, shown in FIGS. 6–14, pusher bars are mounted between two parallel strands of chain. Products are supported on idler wheels as they are pushed along the conveyor path by the pusher bars. (The term "idler wheels", as used in this description and claims, refers to any length of idler wheels, including long idler wheels, which would otherwise normally be referred to as rollers.) In the sortation area, the idler wheels are steerable, so that, if the product is to go straight along the main conveyor path, the idler wheels are directed straight ahead, and, if the product is to be sorted off of the main conveyor path, the idler wheels are steered at an angle to direct the product off of the main path onto a second path.

Figure 15:
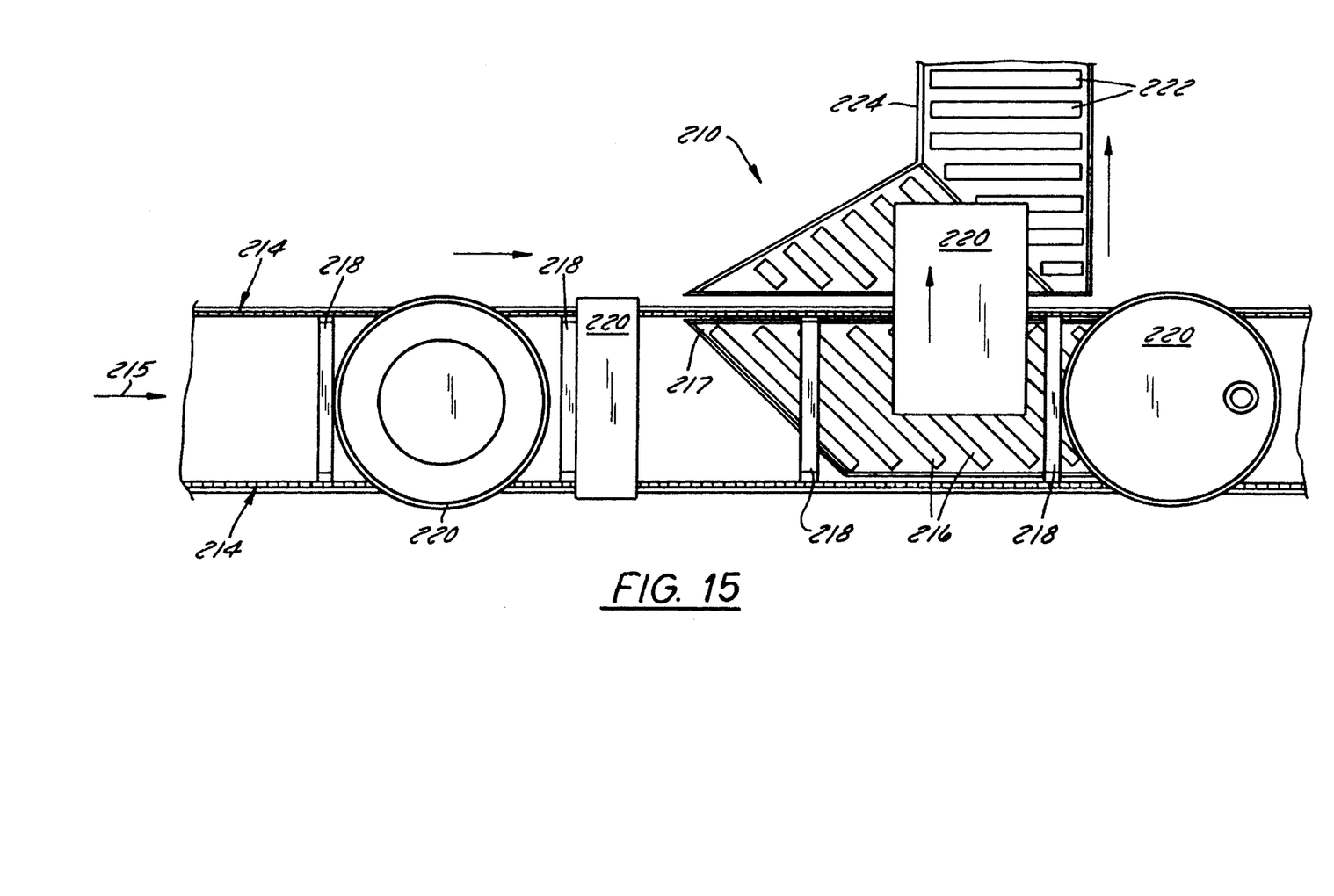
FIG. 15 is a plan view of a third embodiment of the sorter of the present invention.
Figure 16:
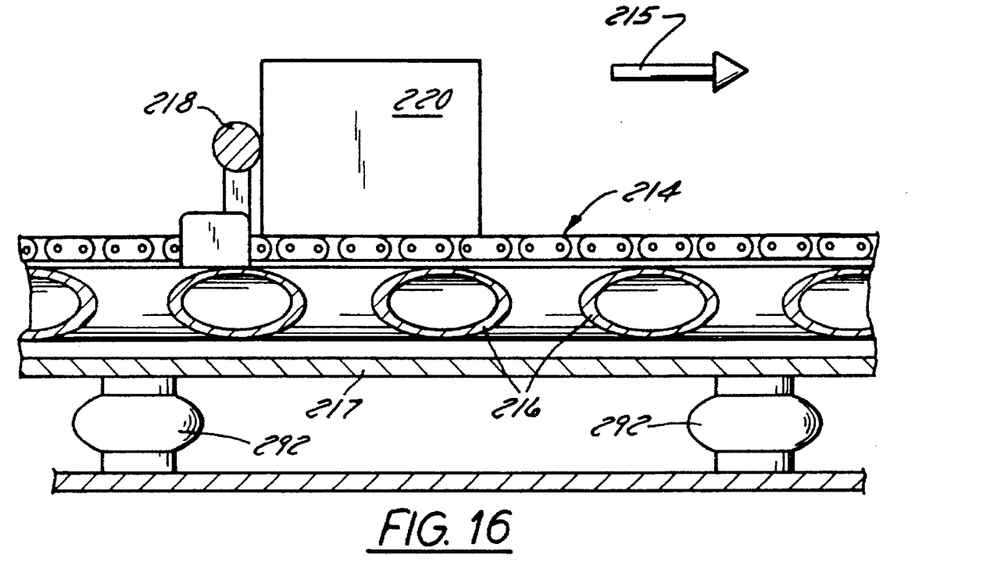
FIG. 16 is a sectional view showing a product going straight through the sorter of FIG. 15.
Figure 17:
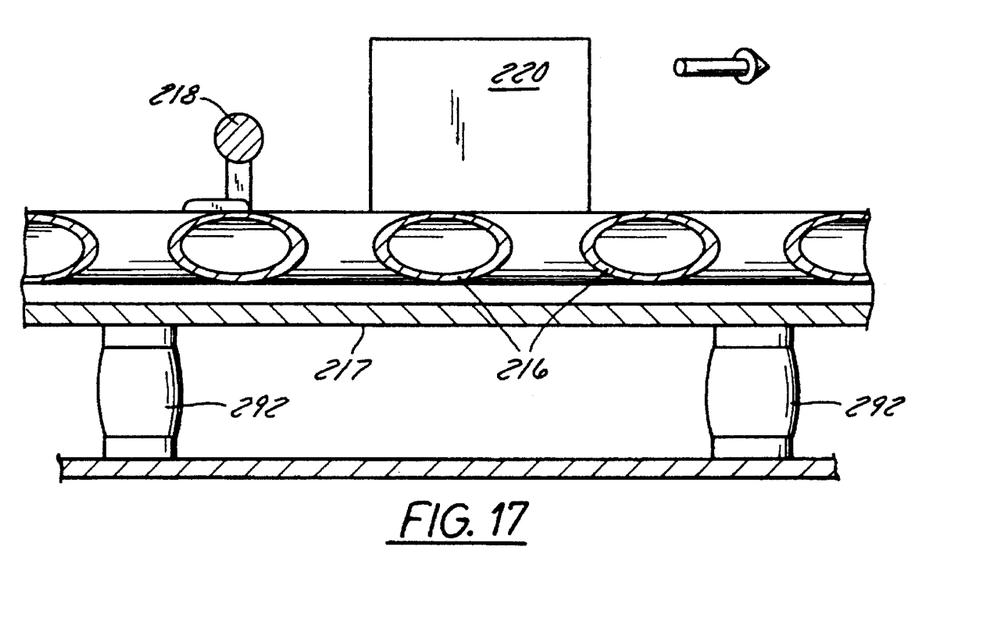
FIG. 17 is a sectional view showing a product being sorted off of the main conveyor path of the sorter of FIG. 15.

The third embodiment of the invention, shown in FIGS. 15–17, is very similar to the second embodiment, except that products are generally carried directly on the same chain that carries the pusher bars. In order to sort the products off of the main conveyor path, angled idler wheels are shifted up into contact with the products. When the products are to go straight, the idler wheels are shifted down, out of contact with the products.

Figure 18:
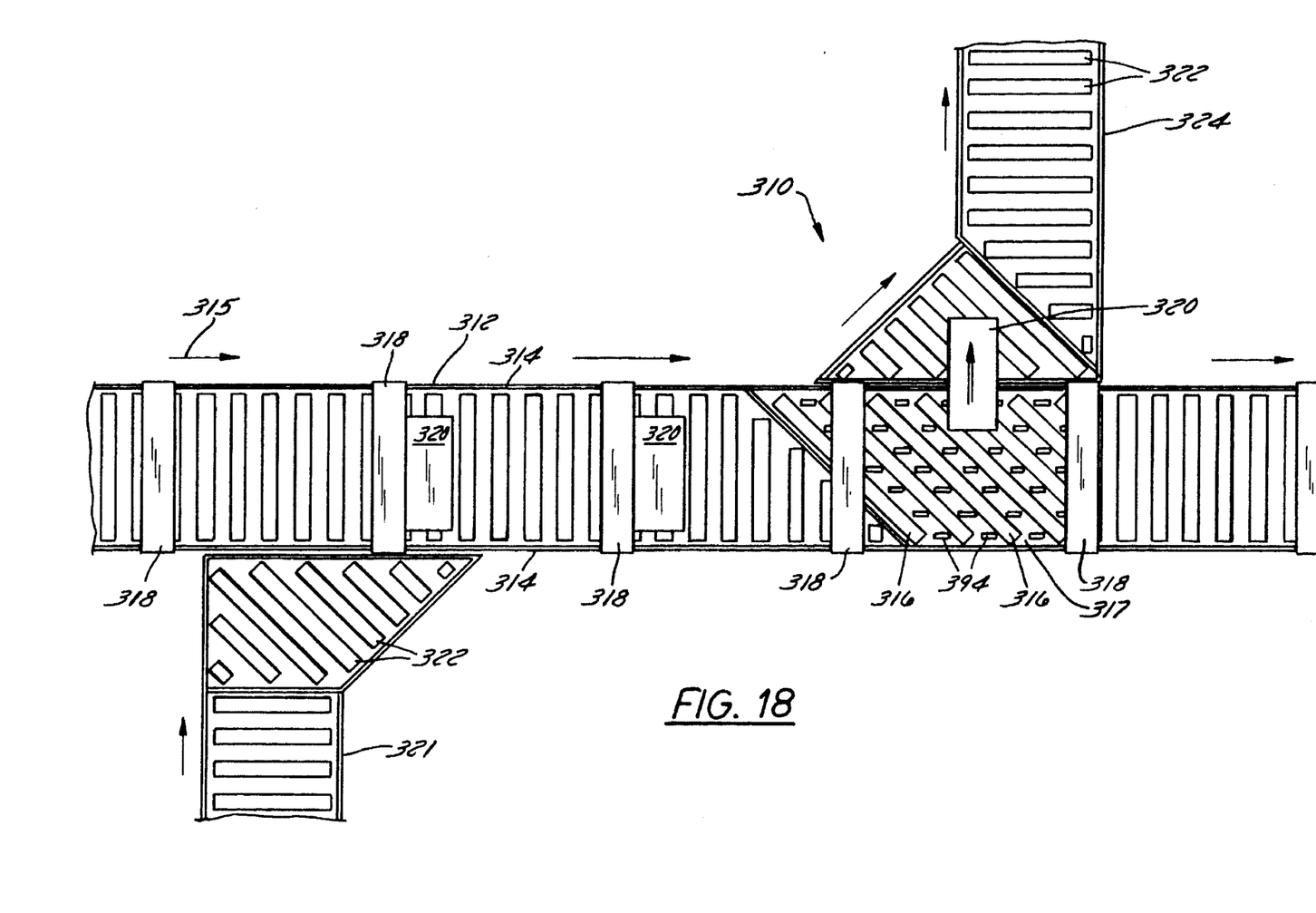
FIG. 18 is a plan view of a fourth embodiment of the sorter of the present invention.
Figure 19:
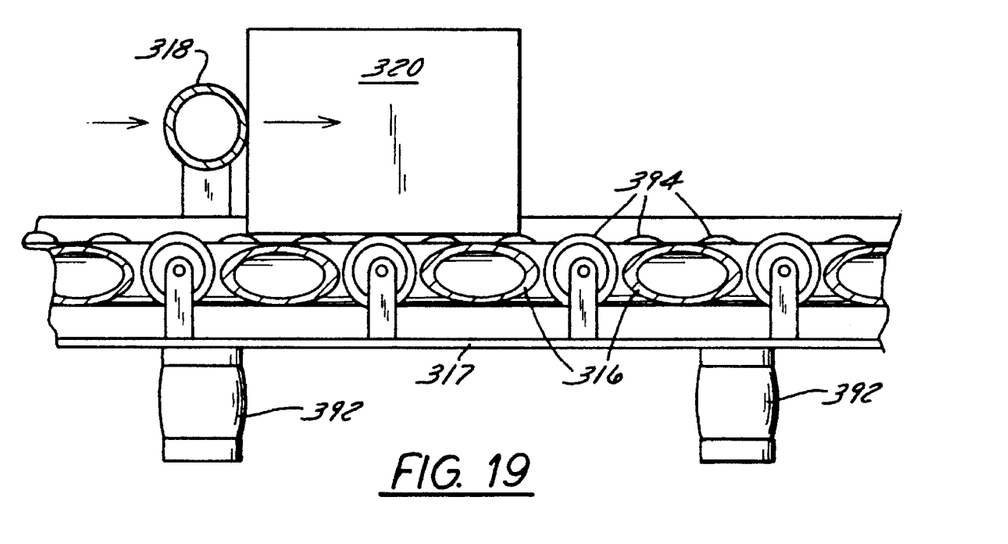
FIG. 19 is a sectional view showing a product going straight through the sorter of FIG. 18.
Figure 20:
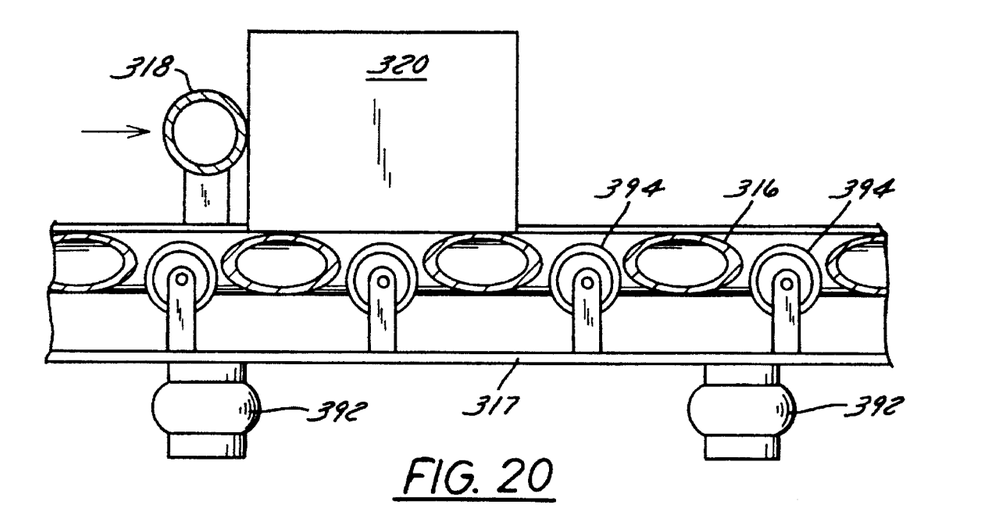
FIG. 20 is a sectional view showing a product being sorted off of the sorter of FIG. 18.

The fourth embodiment of the invention, shown in FIGS. 18–20, is very similar to the second embodiment, except that, instead of having steerable idler wheels, there are two sets of idler wheels arranged at different angles. The first set of idler wheels is set so as to direct the product straight through, along the main conveyor path. This set of idler wheels shifts up to contact the products and down to be out of contact with the products. The second set of idler wheels is set at an angle, to direct products off of the main path. This set of idler wheels is at a fixed height, so as to contact the products when the first set of wheels is shifted down, and so as to be out of contact with the product when the first set of wheels is shifted up.

THE FIRST PREFERRED EMBODIMENT, FIGS. 1–5

Figure 1:
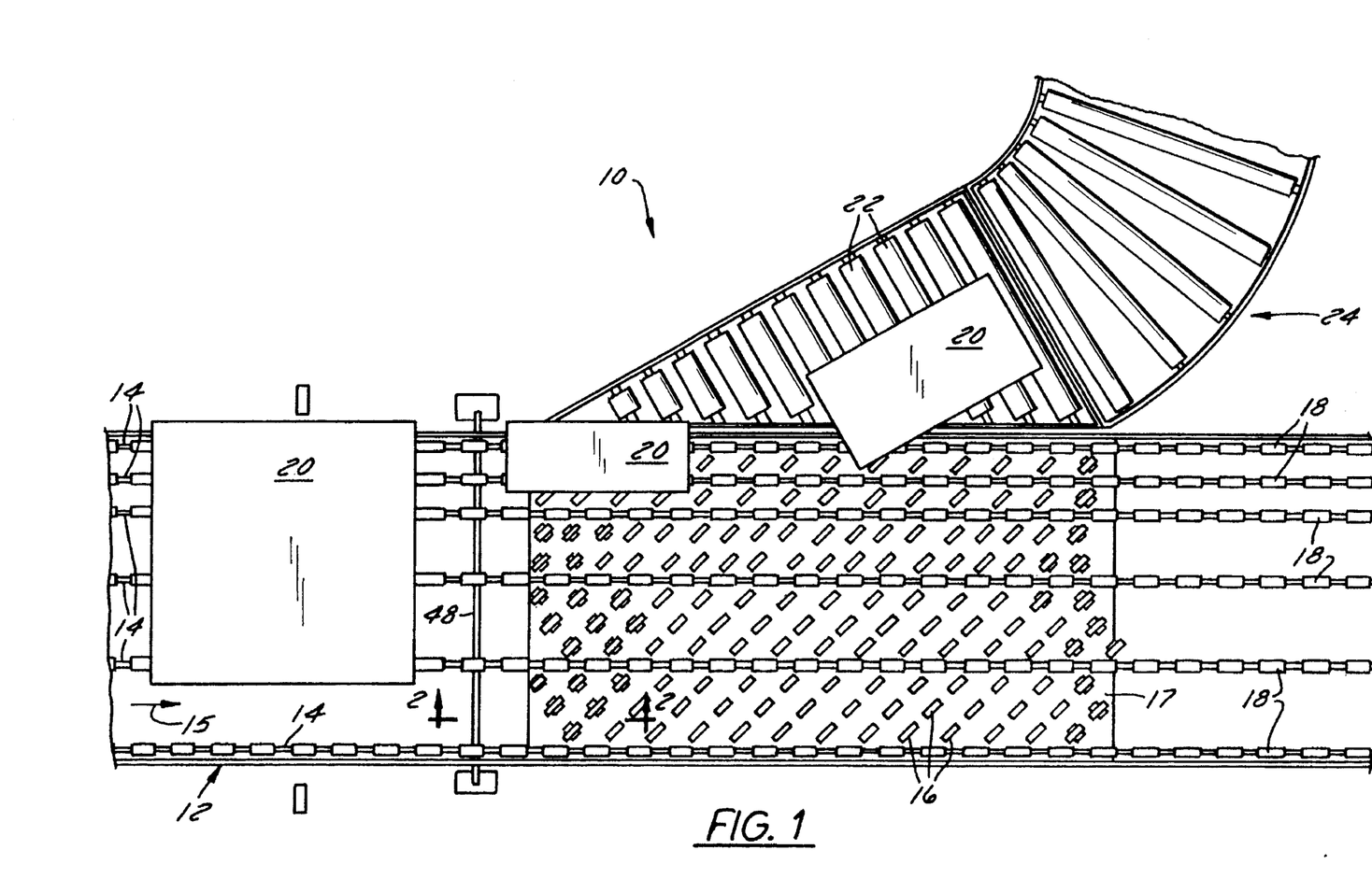
FIG. 1 is a plan view of a first embodiment of a sorter made in accordance with the present invention.

Looking first at FIG. 1, there is a sorter 10, which includes a conveyor frame 12 which defines a horizontal main conveyor path 15. The conveyor frame 12 supports several parallel strands of roller chain 14. The strands of chain 14 are closer together on one side of the conveyor path 15 and are separated wider apart toward the other side. The products 20 are put onto the conveyor indexed to the one side, so that even small products will be well-supported by the closely-spaced chains 14 on that side.

In the sortation portion of the sorter 10, between parallel strands of roller chain 14, are idler wheels 16, set at an angle to the main conveyor path 15. The idler wheels 16 are mounted on a plate 17.

Products 20 can be inducted onto the sorter 10 from the end or from the side.

Each strand of chain 14 has a plurality of carrier attachments 18 mounted on it. The products 20 rest on top of the carrier attachments 18 when they are being carried along the main conveyor path. If a product 20 is to be sorted off of the main conveyor path, the carrier attachments 18 under the product 20 drop down over the appropriate set of diverting idler wheels 16, setting the product 20 down onto the diverting idler wheels 16. The diverting idler wheels 16 also lie in a horizontal plane, so that the product must be pushed along the idler wheels 16 in order to move. The carriers 18 behind the product 20 do not drop down, and, instead, serve as pushers, pushing the product 20 along the diverting idler wheels 16, until the product 20 is off of the main conveyor path 15. Once the product 20 begins to move off of the main conveyor path 15, it is picked up by driven wheels 22 on an alternative path, which are driven at a higher speed than the chain 14, and which pull the product 20 ahead, onto the side path 24.

Figure 2:
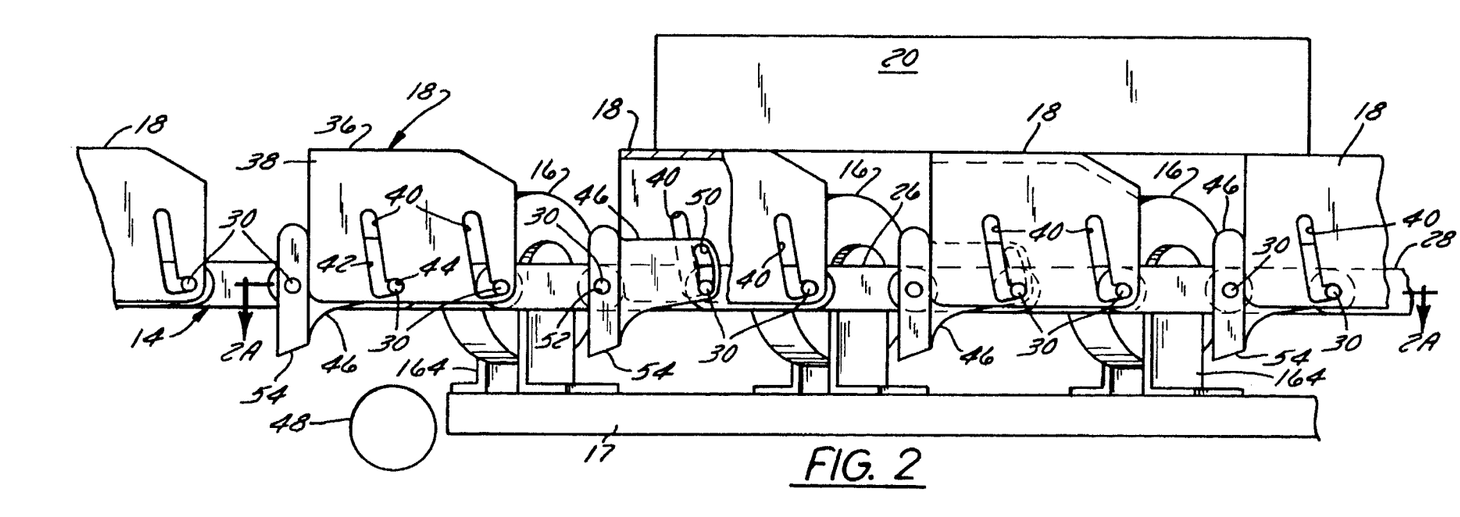
FIG. 2 is view taken along the section 2—2 of FIG. 1.
Figure 2A:
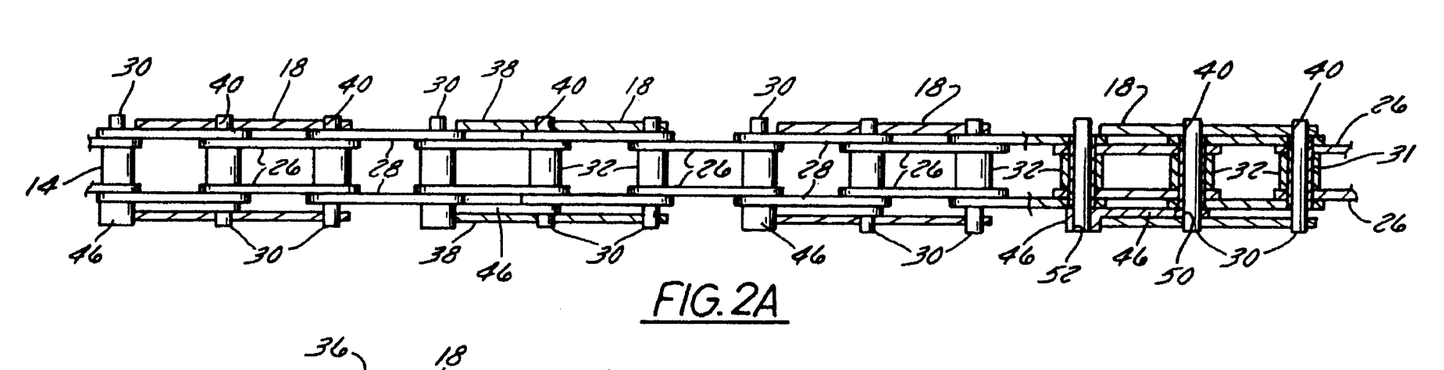
FIG. 2A is a top sectional view of a portion of the conveyor shown in FIG. 2.
Figure 2B:
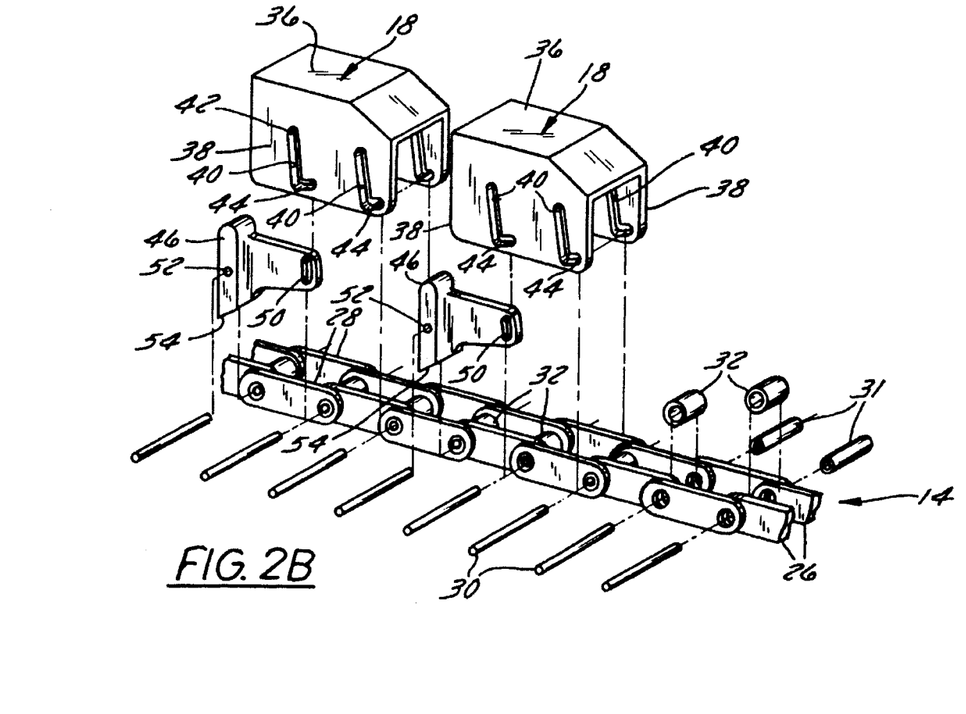
FIG. 2B is an exploded perspective view of a portion of the conveyor shown in FIG. 2.
Figure 3:
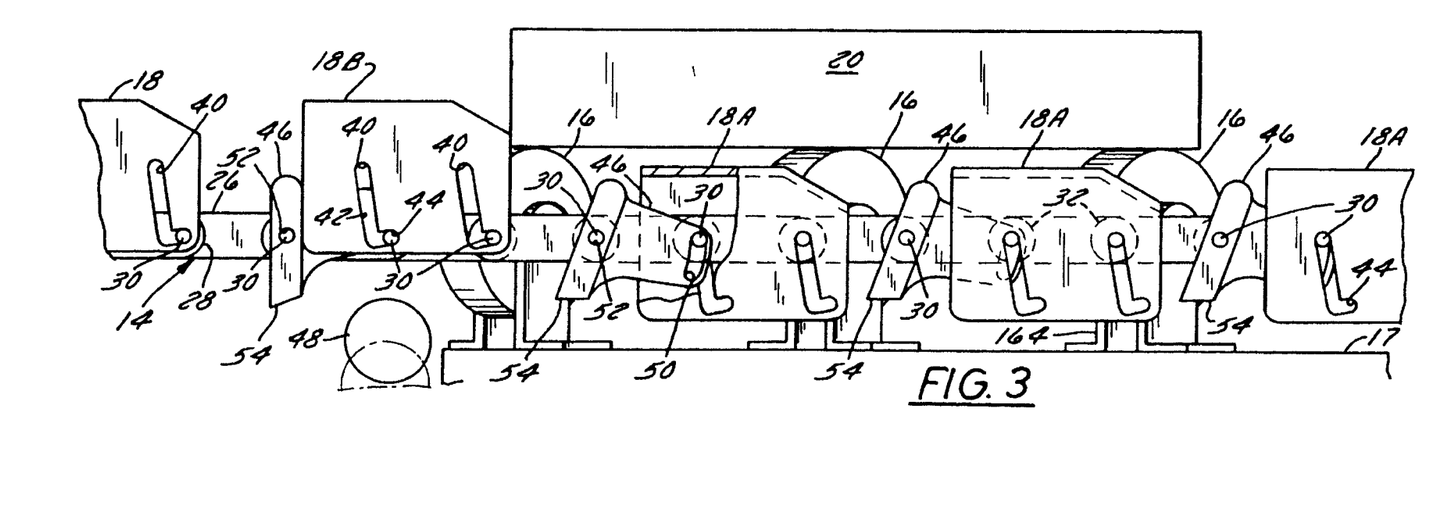
FIG. 3 is the same view as FIG. 2, but with some of the carriers dropped down, depositing the product on the diverter wheels.
Figures 4, 4A:
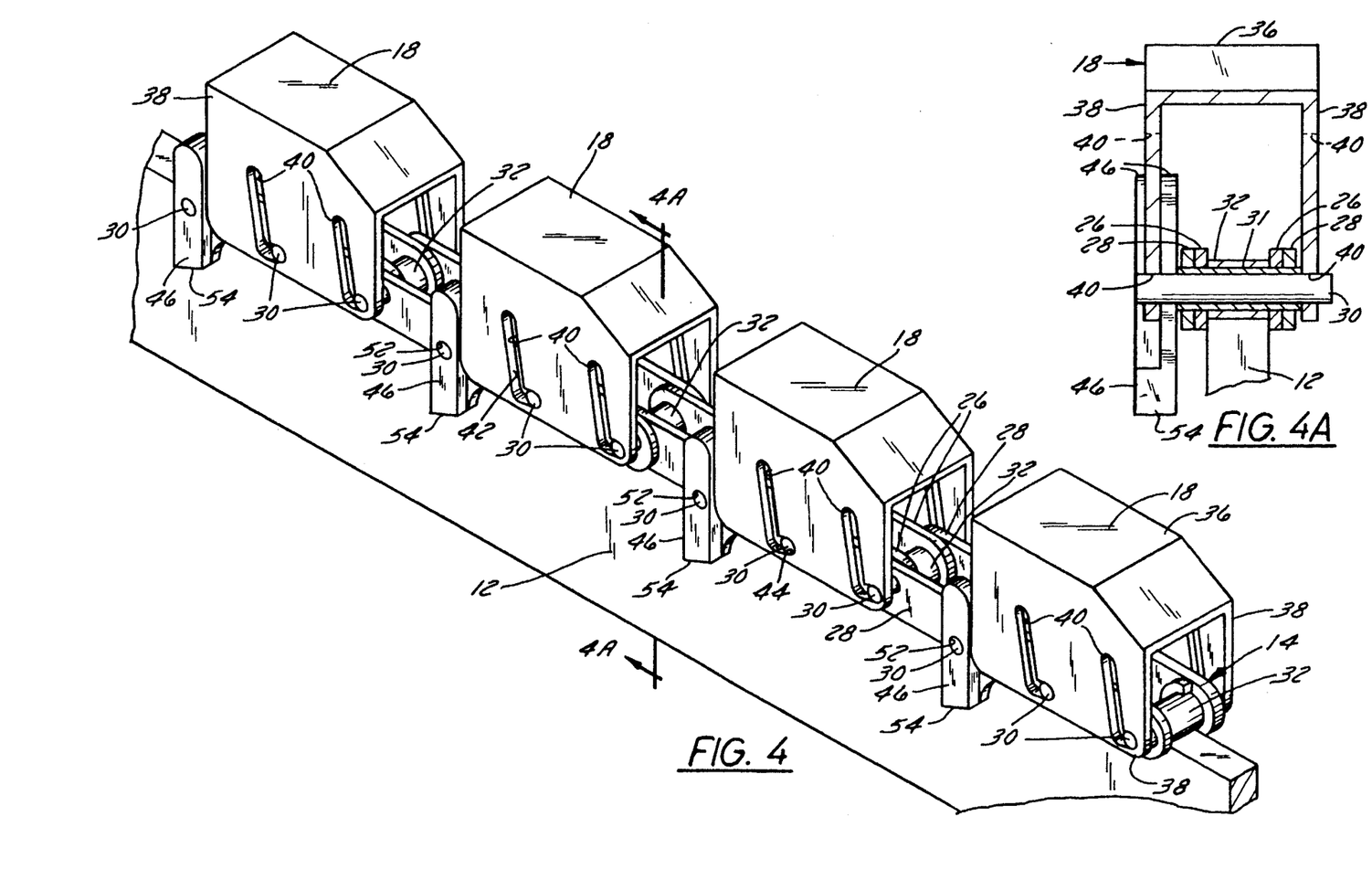
FIG. 4 is a perspective view of one of the chains in the sorter of FIG. 1.
FIG. 4A is a view taken along the section 4A—4A of FIG. 4.

FIGS. 2–4 show the details of the carriers 18 and the idler wheels 16. The roller chain 14 is a typical roller chain, with equal length inner sidebars 26 and outer sidebars 28, which, when assembled, form inner links and outer links. These inner sidebars 26 and outer sidebars 28 are connected together by chain pins 30 and bushings 31. Each bushing 31 is press fit into its two respective inner sidebars 26, and outer sidebars 28, forming inner links from the inner sidebars and outer links from the outer sidebars. The outer sidebars 28 can pivot about the bushings 31 so that the chain can flex about the sprockets. A roller 32 is mounted for rotation over each bushing 31 between the two inner sidebars 26. The chain pins 30 extend through their respective bushings 31 and project outwardly, beyond the outer links 28, so as to carry a shiftable attachment 18 and a shift mechanism 46 to the rear of each shiftable attachment 18.

The shiftable attachment 18 and its respective shift mechanism 46 are mounted on three adjacent pins 30, and then the next three chain pins carry the next shiftable attachment 18 and its shift mechanism 46.

The shiftable attachments 18 have a flat top 36, for carrying products. On each side 38 of each attachment 18 are forward and rear, substantially L-shaped holes, so that each forward chain pin 30 projects into two opposed, forward L-shaped holes, and each rear chain pin 30 projects into two opposed, rear L-shaped holes. The L-shaped holes 40 are at a slight angle to the vertical, so that the substantially vertical leg 42 of the L-shaped hole is at an angle alpha of approximately 10° from the vertical, and the substantially horizontal leg 44 is at an angle beta of approximately 10° from the horizontal. This angle helps ensure that the attachments 18 move smoothly from the "up" position to the "down" position and do not get stuck in between those two positions.

As shown in FIGS. 2 and 4, when the attachments 18 are in the "up" position, the pins 30 are received in the horizontal leg 44 of the L-shaped holes, and, due to the slight angle of the horizontal leg 44, they lie at the distal end of the horizontal legs 44, putting the carrier attachments 18 in the "up" position, in which the attachments 18 carry products on their top surfaces 36. This is also the position in which a carrier attachment 18 can serve as a pusher, as shown in FIG. 3. FIG. 3 shows some carrier attachments 18A, which have dropped down, into the "down" position, with the pins at the distal end of the vertical legs 42 of the L-shaped holes 40. This deposits the product 20 onto the angled idler wheels 16, so that the carrier attachment 18B, directly behind the product 20 pushes the product 20 along the idler wheels 16. The idler wheels 16 are set at an intermediate height, below the height of the carrier attachments in the "up" position, and above the height of the carrier attachments in the "down" position.

The shift mechanism 46 is mounted on two pins 30. The forward end of the shift mechanism 46 defines an arcuate slot 50, which mounts on the same pin 30 as does the back of the attachment 18 which it will shift. That forward portion of the shift mechanism 46 lies between the attachment 18 and the link 26 or 28. The rear portion of the shift mechanism 46 is wider than the forward portion, so that it abuts the back of its respective attachment 18 when the attachment 18 is in the "up" position. The rear portion of the shift mechanism 46 defines a hole 52, which receives a chain pin 30, that defines the pivot point of the shift mechanism 46.

If the trigger 48 is raised when the shift mechanism 46 passes over it, it contacts the downwardly-projecting portion 54 of the shift mechanism 46, causing the shift mechanism 46 to pivot clockwise, as shown in FIG. 3. As the shift mechanism 46 pivots clockwise, the wide portion of the shift mechanism 46 pushes the attachment 18 forward, shifting the attachment 18 forward relative to its mounting pins 30, causing the mounting pins to move into the vertical legs 42 of the attachment, and allowing the attachment 18 to drop down, placing the product on the angled idler wheels 16. Due to the angle of the vertical leg 42, the attachment 18 continues to move forward relative to the chain 14 as it moves down, so that, when the attachment 18 reaches the "down" position, with the pins 30 at the distal end of the vertical legs 42, the shift mechanism 46 no longer abuts the back of the attachment 18.

Once the attachments directly under the product pass over the trigger 48, the trigger 48 is moved back down, by means of a solenoid (not shown) or other known means, so that the attachments 18B directly behind the product 20 are not triggered to drop down. Those attachments 18B then serve as pushers, pushing the products 20 along the angled idler wheels 16.

There may be many sortation stations along the sorter 10, with different sets of angled idler wheels 16, so that the product 20 can be sorted off at any one of several different places, depending upon where the carriers 18 carrying that product 20 are triggered to drop to the "down" position.

Figure 5:
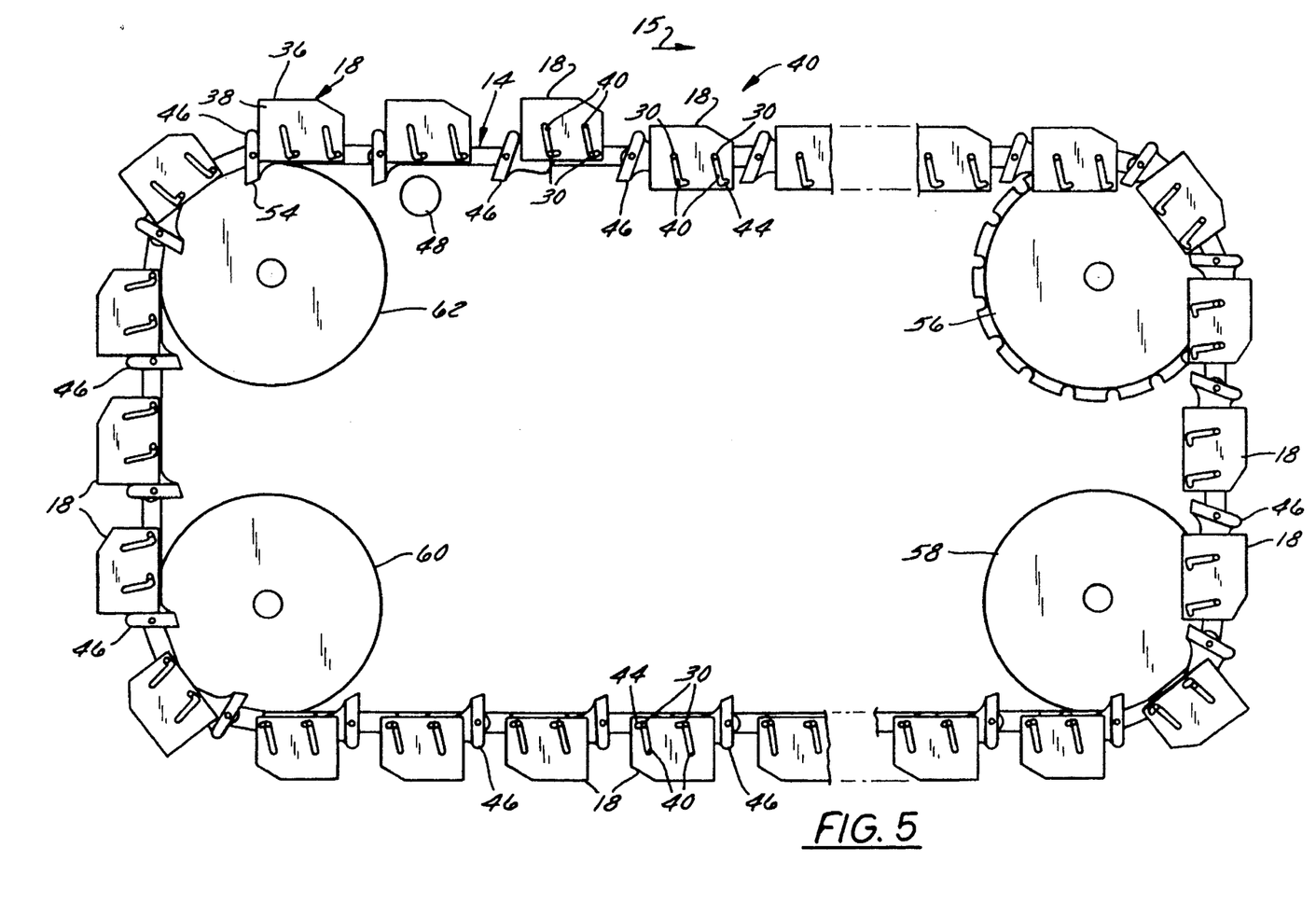
FIG. 5 is a schematic side view of one chain on the sorter of FIG. 1.

The carrier attachments 18 return to their "up" position as they return underneath the frame 12 to the starting point. FIG. 5 shows the chain 14 going over the drive sprocket 56 at the top right and then passing over the lower right idler sprocket 58. As the carriers 18 go from the lower right idler sprocket 58 to the lower left idler sprocket 60, they are upside down, and gravity causes them to shift so that the pins 30 are at the intersection of the horizontal leg 44 and the vertical leg 42 of the L-shaped holes 40. Then, as the attachments 18 pass around the lower left idler sprocket 60, gravity again shifts the carrier attachments 18 relative to their pins 30, so that the pins 30 end up at the distal ends of their respective horizontal legs 42. Then, as the attachments 18 pass around the upper left idler sprocket 62, they are again in the "up" starting position, ready to receive a product.

SECOND PREFERRED EMBODIMENT, FIGS. 6–14

Figure 6:
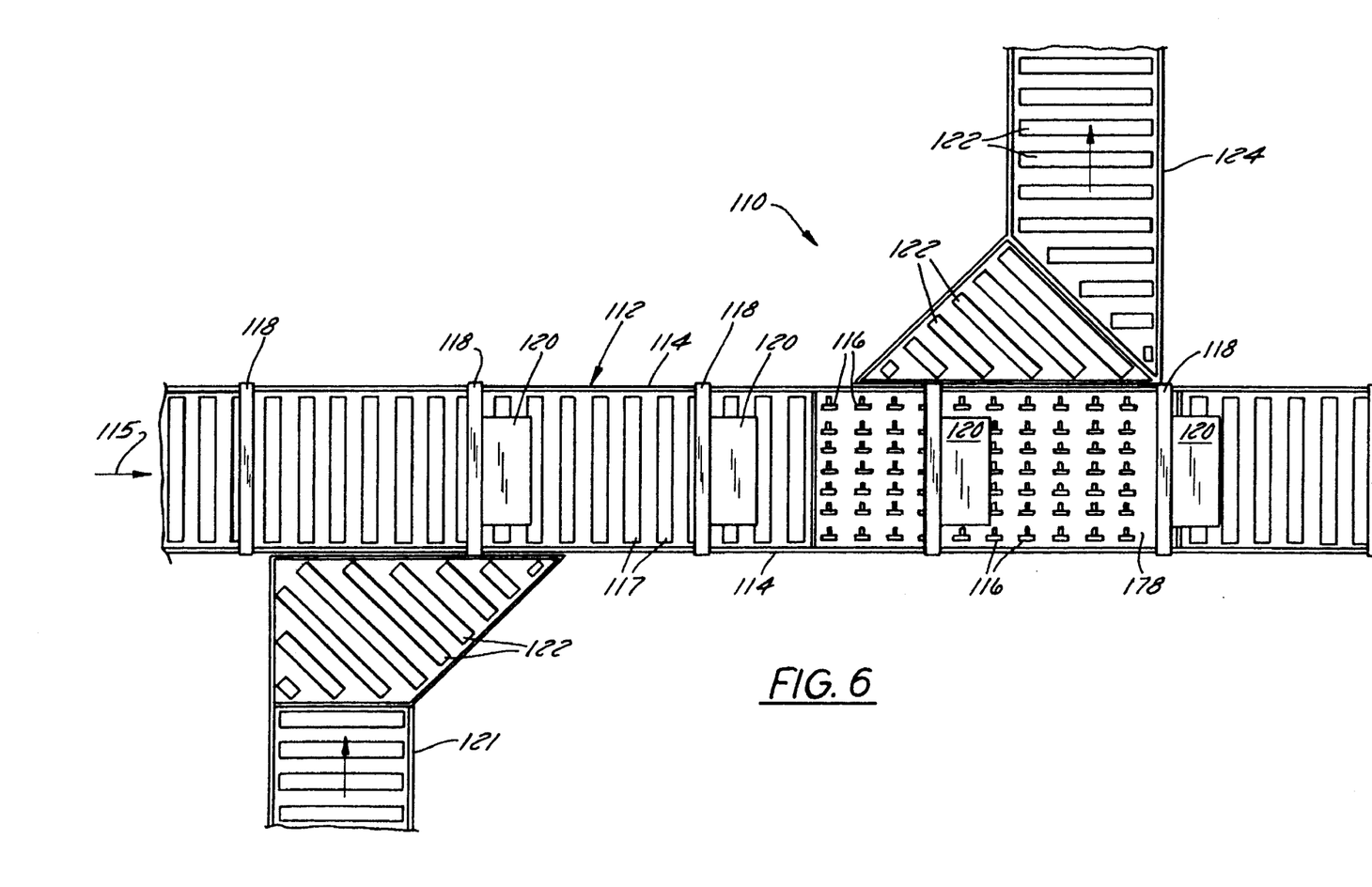
FIG. 6 is a plan view of a second embodiment of a sorter made in accordance with the present invention.

FIG. 6 is a schematic plan view of a second embodiment of a sorter 110 made in accordance with the present invention. In this embodiment, a conveyor frame 112 supports two parallel strands of chain 114. These two parallel strands of chain 114 carry pusher attachments 118, which extend between the two strands of chain 114 above the conveyor frame 112. Across the conveyor frame 112 are mounted horizontal idler rollers 117, which define a main conveyor path 115. In the sortation area are a plurality of steerable idler wheels 116. These idler wheels 116 can be steered straight ahead, to send products along the main path 115, or they can be steered at an angle, to send products off to a second path. The products 120 can be inducted from the end of the conveyor or from side paths, such as the side path 121. The side paths include driven wheels or rollers.

Figure 7:
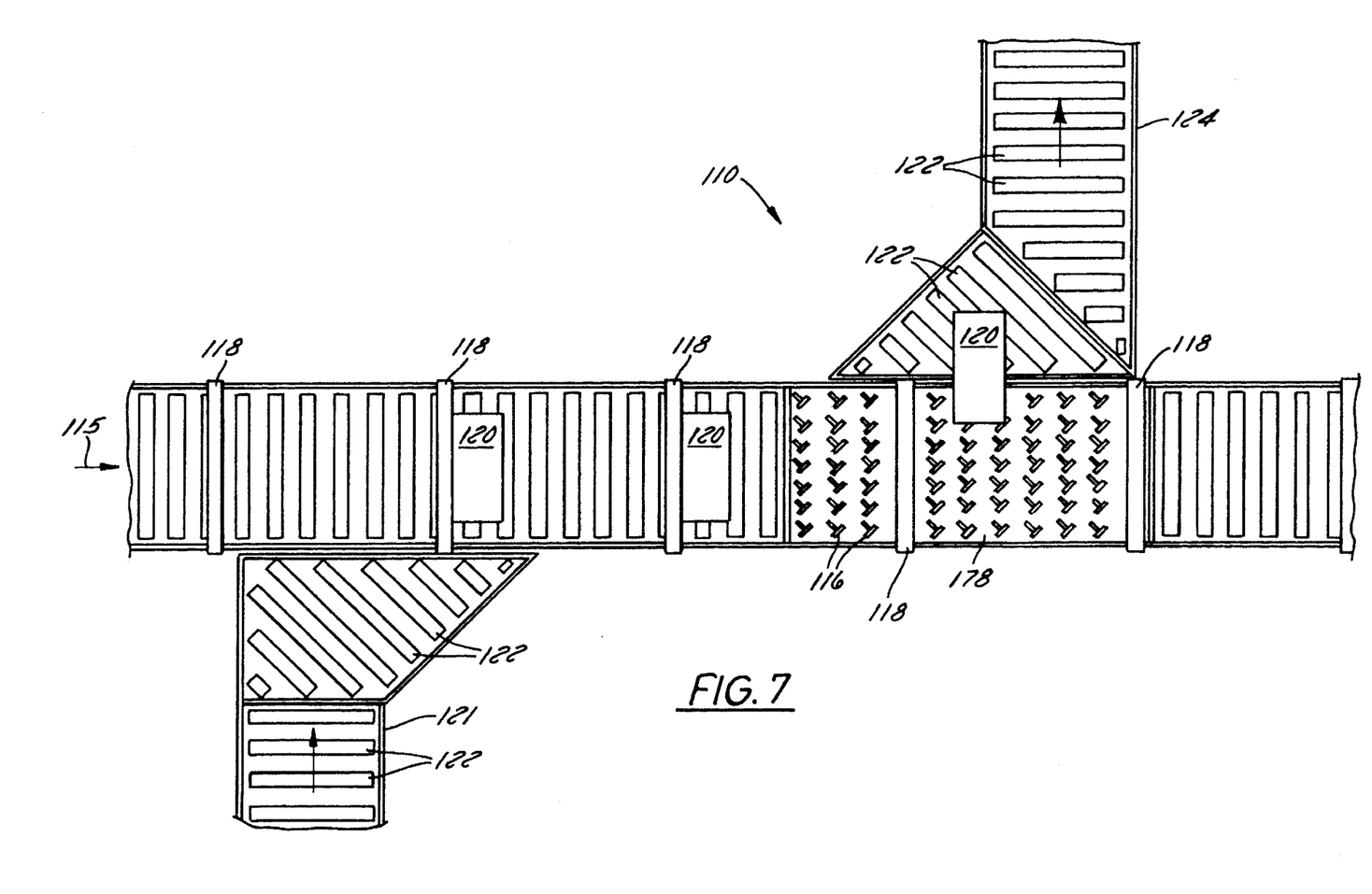
FIG. 7 is the same view as FIG. 6, but with the diverter wheels shifted to divert products off of the sorter.

FIG. 6 shows the idler wheels 116 directed straight ahead, so that products pushed over them continue along the main conveyor path 115. FIG. 7 shows the idler wheels 116 steered to the left, so that the products 120 being pushed over the idler wheels 116 are directed off of the main conveyor path 115 onto a second path 124.

Figure 8:
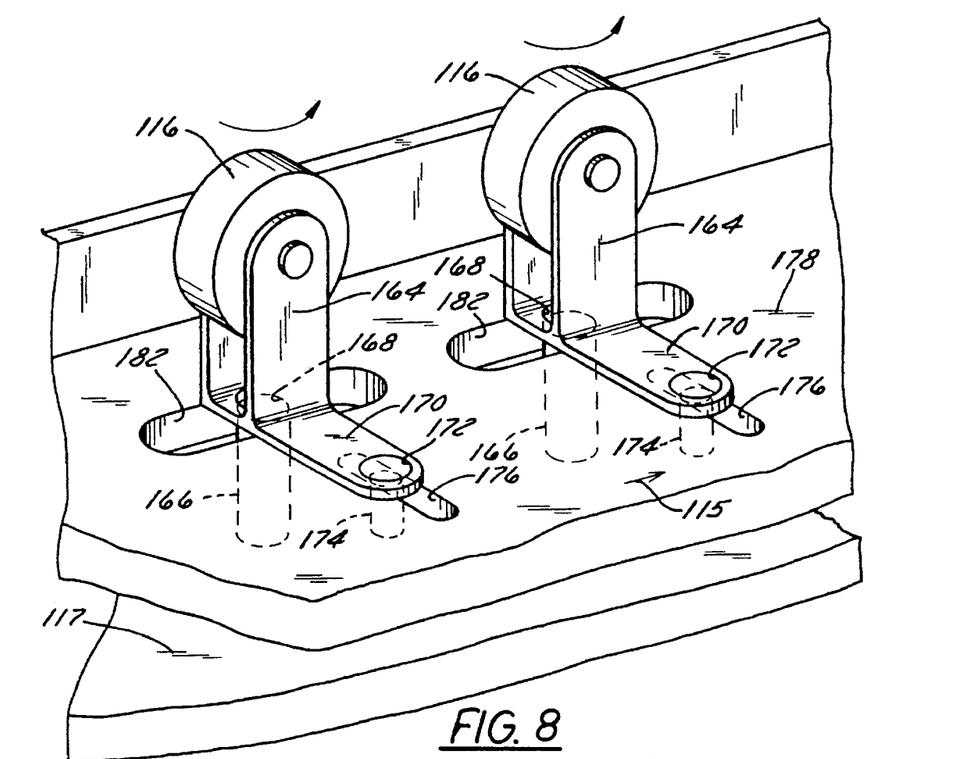
FIG. 8 is a perspective view of two of the diverter wheels in the sorter of FIG. 6.
Figure 9:
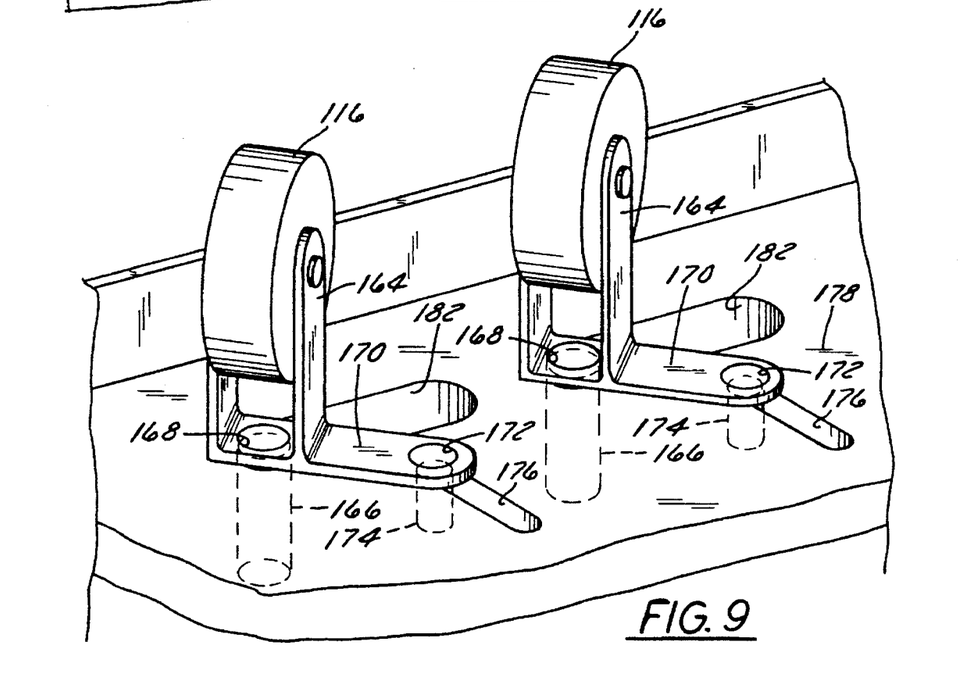
FIG. 9 is the same view as FIG. 8, but with the diverter wheels shifted.
Figure 10:
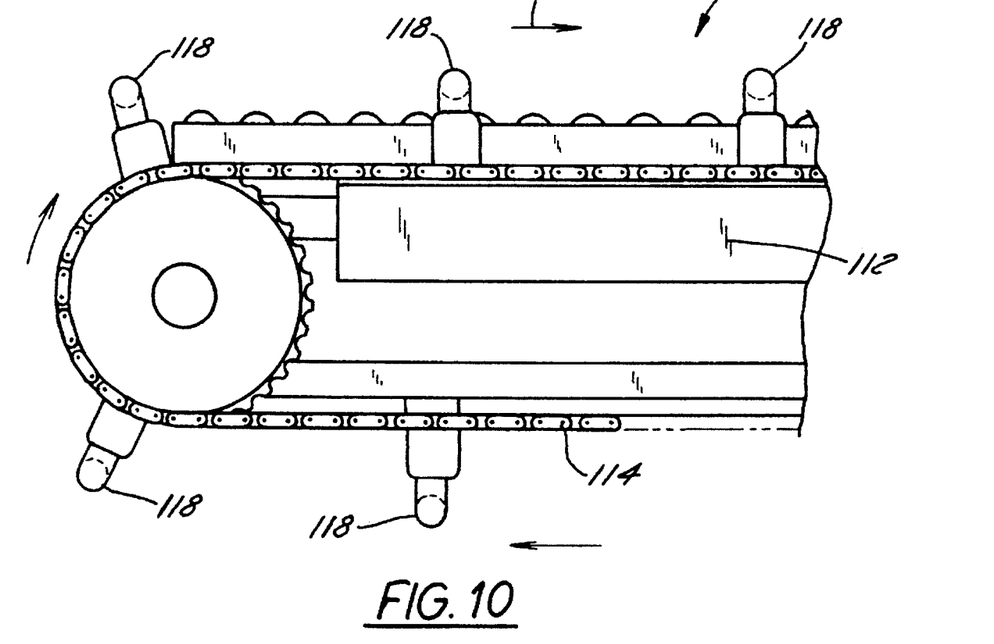
FIG. 10 is a schematic side view of the sorter of FIG. 6.
Figure 11:
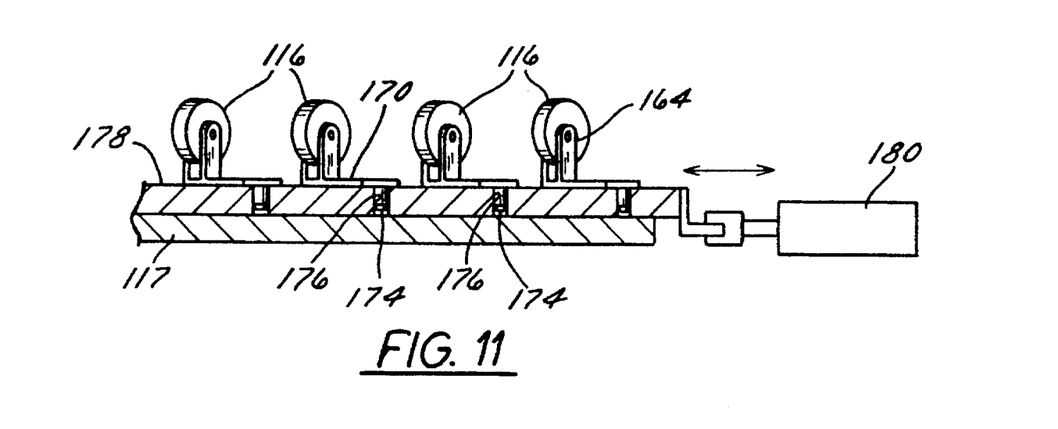
FIG. 11 is a sectional view showing the steering mechanism for steering the diverter wheels of FIG. 6.

Looking at FIGS. 8, 9, and 11, each idler wheel 116 is mounted for rotation on a support bracket 164. The portion of the support bracket 164 directly below the idler wheel 116 defines a hole 168 which mounts onto a mounting pin 166 that is fixed onto a lower plate 117. The pin 166 extends through a slot 182 in the upper plate 178. The support bracket 164 is mounted on the mounting pin 166 so as to pivot about the mounting pin 166. A bracket arm 170 defines a second hole 172, which mounts onto a second mounting pin 174, which is received in a slot 176 in an upper plate 178, that lies on top of the lower plate 117. The lower plate 117 is fixed relative to the conveyor frame, and the upper plate 178 can be moved forward and backward relative to the lower plate by an actuator 180, shown in FIG. 11.

When the upper plate 178 is in the position shown in FIG. 8, the idler wheels 116 face directly along the main path 115, putting the sorter in the position shown in FIG. 6. When the upper plate is shifted forward, as shown by the arrow in FIG. 8, the bracket arm 170 is moved forward, causing the support bracket 164 to pivot about the mounting pin 166, so that the idler wheel 116 is angled to the side, to send products off of the main conveyor path 115, putting the conveyor into the configuration shown in FIG. 7. If the upper plate 178 were instead shifted backward relative to the bottom plate 117, the idler wheels 116 would be directed to send products off of the other side of the main path 115.

Figure 12:
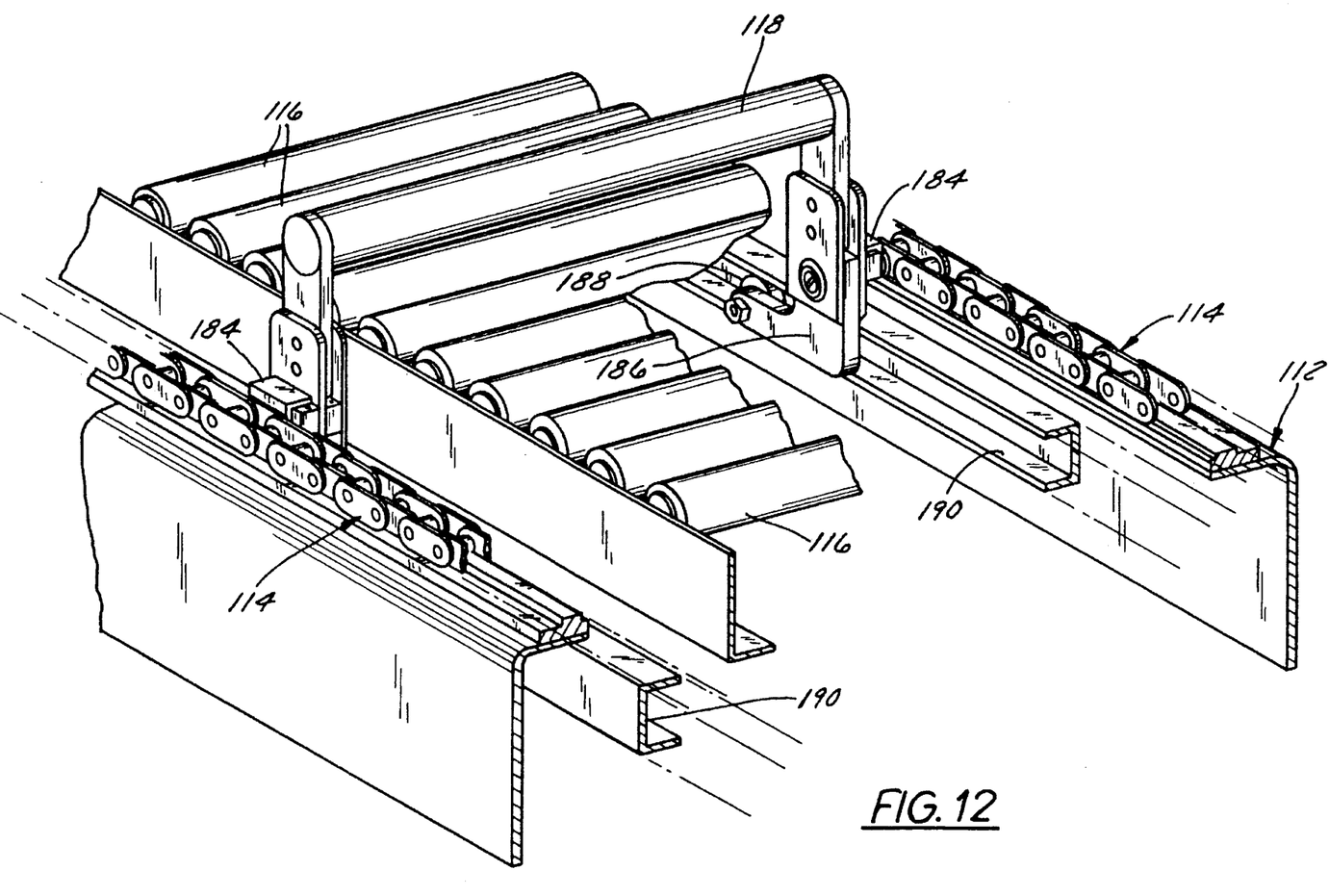
FIG. 12 is a broken-away perspective view of a portion of the sorter of FIG. 6, showing the pusher mechanism.
Figure 13:
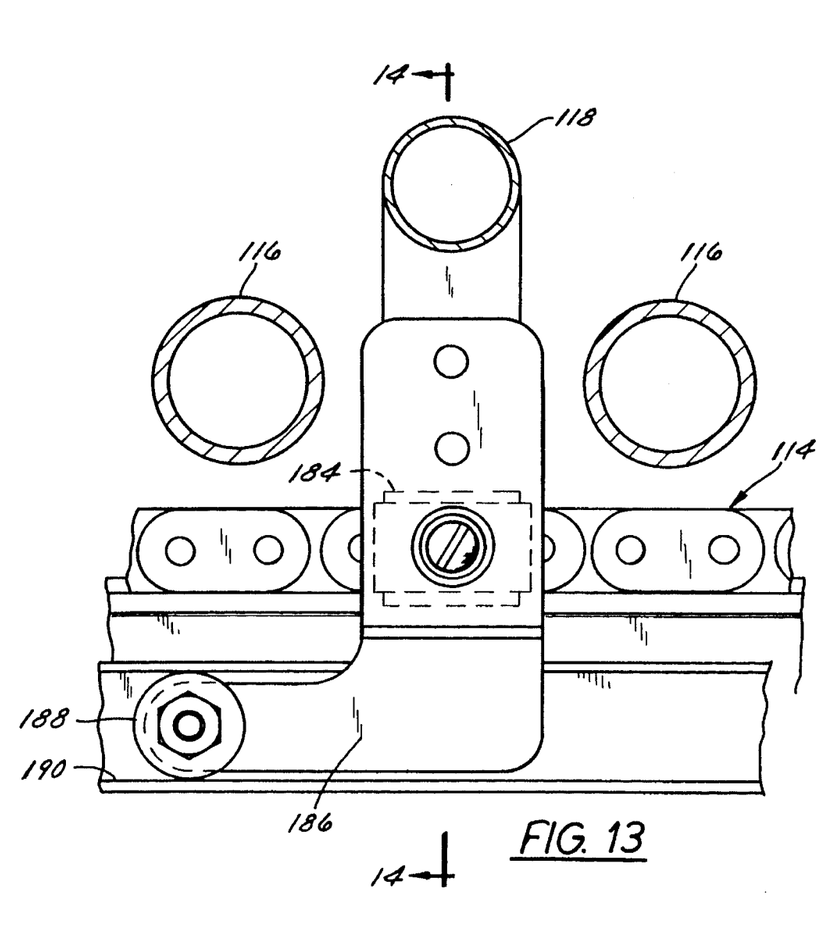
FIG. 13 is a side sectional view showing the pusher mechanis of FIG. 12.
Figure 14:
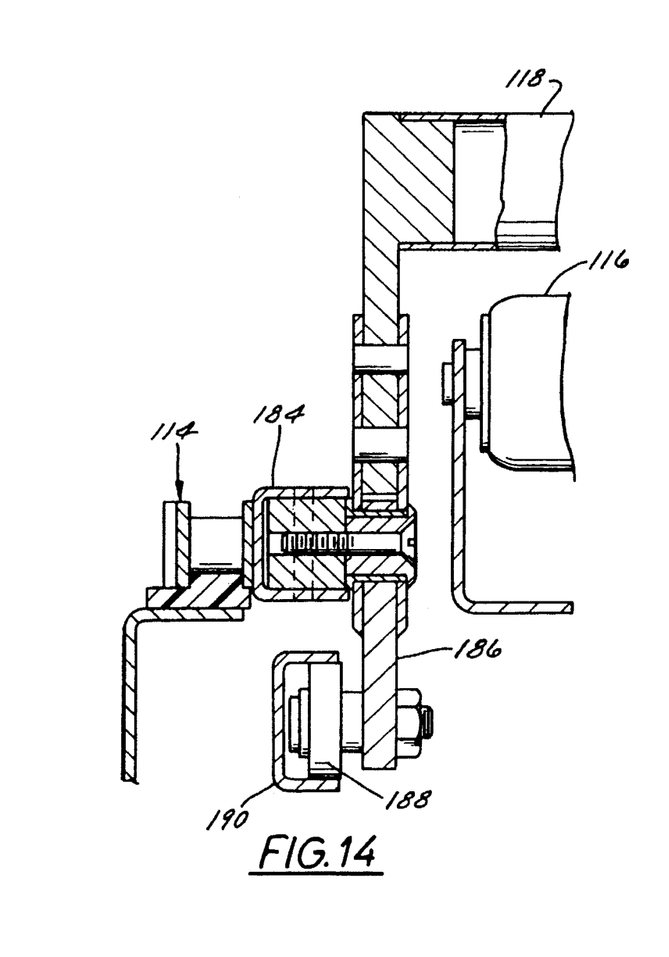
FIG. 14 is a view taken along the section 14—14 of FIG.

FIGS. 12–14 show the manner in which the pusher bars 118 are mounted on the chain 114 and on the conveyor frame 112. Each pusher bar 118 is screwed into left and right attachments 184, which are affixed to the left and right chains 114, respectively. Each pusher bar 118 also has left and right arms 186, which carry left and right wheels 188, which ride in left and right tracks 190, respectively. This prevents the pushers from pivoting relative to the chain 114 during normal operation.

THE THIRD EMBODIMENT, FIGS. 15–17

This embodiment is essentially the same as the second embodiment, except that the products 220 ride on the chain 214 as they go along the main conveyor path 215. The angled idler wheels 216 are mounted on a vertically-shiftable plate 217. When the plate 217 is down, as shown in FIG. 16, the products 220 do not come into contact with the idler wheels 216 and continue along the main conveyor path. When the air bags 292 are filled with air, the plate 217 is shifted upwardly, bringing the angled idler wheels 216 into contact with the products 220, so that, as the products 220 are pushed along the idler wheels 216, they are sent off of the main conveyor path, onto the side path 224.

THE FOURTH EMBODIMENT, FIGS. 18–20

This embodiment of the conveyor 310 includes a conveyor frame 312 and two strands of chain 314 carrying pusher bars 318, as in the previous embodiment. In this embodiment, there are straight idler wheels 394, which support products on the main path 315. In the sortation area, there are also angled idler wheels 316, mounted at a fixed height. In the sortation area, the straight idler wheels 394 are mounted on a shiftable plate 317, so that, when the air bags 392 are filled and the plate 317 shifts up, the straight idler wheels 394 are in contact with the product, as shown in FIG. 19. When the plate 317 goes down, the products in the sortation area ride on the angled idler wheels 316, which direct the products off of the main path 315 onto a side path 324 with driven rollers.

It will be obvious to those skilled in the art that modifications may be made to the embodiments described above without departing from the scope of the present invention.

What is claimed is:

1. A conveyor for use in the sortation of articles, comprising:

a conveyor frame defining a first path over which articles may be conveyed;

a plurality of chain-driven pushers for pushing articles along said first path;

a plurality of diverting idler wheels which can be directed at an angle to said path; and a steering mechanism for steering said diverting idler wheels from a first position, directing the articles along said first path, to a second position, directing the articles at an angle to said first path; such that, when said pushers push articles along said first path, and said articles contact said diverting idler wheels directed at an angle to said path, said diverting idler wheels direct said articles off of said first path.

2. A conveyor for use in the sortation of articles, comprising:

a conveyor frame defining a first path over which articles may be conveyed;

a plurality of chain-driven pushers for pushing articles along said first path; and a plurality of diverting idler wheels which can be directed at an angle to said path such that, when said pushers push articles along said first path, and said articles contact said diverting idler wheels directed at an angle to said path, said diverting idler wheels direct said articles off of said first path, wherein said chain-driven pushers comprise:

a plurality of parallel chains; and a plurality of carrier attachments mounted on their respective chains, said carrier attachments being movable from an "up" position at a height above said diverting idler wheels to a "down" position at a height below said diverting idler wheels, such that, when said carrier attachments are in the "up" position, they can carry articles over said diverting idler wheels without said diverting idler wheels contacting the articles, and, when some of said carrier attachments drop to the "down" position, they lower the articles onto the diverting idler wheels, so that others of said carrier attachments in the "up" position behind the articles serve as pushers to push the articles along the diverting idler wheels.

3. A conveyor as recited in claim 2, wherein said chains include chain pins, and said carrier attachments are mounted on said chain pins, said carrier attachments having substantially "L-shaped" grooves in their sides into which the chain pins are mounted; and further comprising a shift mechanism mounted adjacent to each carrier attachment to shift its respective attachment from the "up" position to the "down" position on command.

4. A conveyor as recited in claim 3, wherein said conveyor includes a second path, which diverges from said first path, and further comprising a trigger located on said conveyor upstream of said second path for triggering said shift mechanisms to move said carrier attachments to the "down" position.

5. A conveyor for use in the sortation of articles, comprising:

a conveyor frame defining a first path over which articles may be conveyed;

a plurality of chain-driven pushers for pushing articles along said first path; and a plurality of diverting idler wheels which can be directed at an angle to said path such that, when said pushers push articles along said first path, and said articles contact said diverting idler wheels directed at an angle to said path, said diverting idler wheels direct said articles off of said first path, wherein said pushers are mounted across two parallel chains.

6. A conveyor as recited in claim 5, wherein said diverting idler wheels are steerable so that, in one position, they direct products along the first path, and, in another position, they direct products off of the first path.

7. A conveyor as recited in claim 5, wherein said diverting idler wheels are vertically shiftable, between an "up" and a "down" position, so that, in the "up" position, they contact the products being pushed over them and divert the products, and in the "down" position, they are out of contact with the products and do not divert.

8. A conveyor for use in the sortation of articles, comprising:

a conveyor frame defining a first path over which articles may be conveyed;

a plurality of chain-driven pushers for pushing articles along said first path;

a plurality of first idler wheels, directed along said first path; and a plurality of diverting idler wheels directed at an angle to said first path such that, when said pushers push articles along said first path, said articles travel in the direction of the first idler wheels or in the direction of the second idler wheels, depending upon which idler wheels the products contact.

9. A conveyor for use in the sortation of articles as recited in claim 8, and further comprising: a mechanism for changing the relative height of said first idler wheels and said diverting idler wheels, such that, whichever group of idler wheels is higher is the group that contacts the product.

* * * * *